United States Patent
Ozawa et al.

(10) Patent No.: US 9,914,810 B2
(45) Date of Patent: Mar. 13, 2018

(54) TRANSPARENT CONDUCTIVE FILM AND TOUCH PANEL

(75) Inventors: Hiroki Ozawa, Ibaraki (JP); Hiroyuki Takao, Ibaraki (JP); Minoru Kanatani, Ibaraki (JP); Wataru Nagatake, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 639 days.

(21) Appl. No.: 13/421,931

(22) Filed: Mar. 16, 2012

(65) Prior Publication Data
US 2012/0237729 A1 Sep. 20, 2012

(30) Foreign Application Priority Data

Mar. 16, 2011 (JP) .................................. 2011-058156
Jan. 27, 2012 (JP) .................................. 2012-015352

(51) Int. Cl.
*B32B 3/00* (2006.01)
*B32B 5/16* (2006.01)
(Continued)

(52) U.S. Cl.
CPC .............. *C08J 7/045* (2013.01); *C08J 7/047* (2013.01); *C08J 2367/02* (2013.01); *C08J 2433/00* (2013.01); *Y10T 428/24405* (2015.01)

(58) Field of Classification Search
USPC ....... 428/141, 142, 143, 147, 148, 149, 323, 428/327, 328, 329, 330, 331; 345/173
See application file for complete search history.

(56) References Cited

U.S. PATENT DOCUMENTS

2007/0252825 A1    11/2007 Nashiki et al.
2009/0029151 A1*   1/2009 Noguchi et al. .............. 428/327
(Continued)

FOREIGN PATENT DOCUMENTS

CN    101063922 A    10/2007
JP    10-323931 A    12/1998
(Continued)

OTHER PUBLICATIONS

Korean Office Action dated Mar. 28, 2013, issued in corresponding Korean Patent Application No. 10-2012-0026041, w/ English translation.
(Continued)

*Primary Examiner* — Joanna Pleszczynska
(74) *Attorney, Agent, or Firm* — Westerman, Hattori, Daniels & Adrian, LLP

(57) ABSTRACT

A transparent conductive film having a transparent polymer substrate and a transparent conductive layer on one main surface of the transparent polymer substrate. A cured resin layer with surface irregularities is formed: at least one of: between the transparent polymer substrate and the transparent conductive layer; and on the main surface opposite to the surface with the transparent conductive layer formed thereon of the transparent polymer substrate. The cured resin layer is preferably 1 μm or more and 3 μm or less in thickness and preferably contains a resin composition containing at least two components that undergo phase separation based on a difference in physical properties and 0.01 to 5 parts by weight of fine particles to 100 parts by weight of the solid content of the resin composition. The particle size of the fine particles is preferably 25 to 80% of the thickness of the cured resin layer.

6 Claims, 1 Drawing Sheet

(51) Int. Cl.
  *B32B 27/06* (2006.01)
  *C08J 7/04* (2006.01)

(56) References Cited

U.S. PATENT DOCUMENTS

| | | |
|---|---|---|
| 2009/0284475 A1 | 11/2009 | Nashiki et al. |
| 2009/0315849 A1 | 12/2009 | Ito |
| 2010/0260986 A1 | 10/2010 | Ito |
| 2010/0289762 A1 | 11/2010 | Ito et al. |
| 2012/0015144 A1 | 1/2012 | Itoh et al. |
| 2012/0032900 A1 | 2/2012 | Itoh et al. |

FOREIGN PATENT DOCUMENTS

| | | |
|---|---|---|
| JP | 2002-103504 A | 4/2002 |
| JP | 2007-103348 A | 4/2007 |
| JP | 2009-123685 A | 6/2009 |
| JP | 2010-157439 A | 7/2010 |
| JP | 2010-170986 A | 8/2010 |
| JP | 2010-238455 A | 10/2010 |
| WO | 2008/088059 A1 | 7/2008 |
| WO | 2009/054464 A1 | 4/2009 |

OTHER PUBLICATIONS

Korean Office Action dated Oct. 29, 2013, issued in corresponding Korean Patent Application No. 10-2012-0026041, w/ English translation.
Chinese Office Action dated Jan. 24, 2014, issued in Chinese Patent Application 201210071624.3, w/English translation (15 pages).
Chinese Office Action dated Aug. 13, 2014, issued in corresponding Chinese Patent Application No. 201210071624.3, w/English translation (13 pages).
Office Action dated Dec. 9, 2014, issued in Taiwanese Application No. 101108512, w/English translation. (10 pages).

* cited by examiner

TRANSPARENT CONDUCTIVE FILM AND TOUCH PANEL

BACKGROUND OF THE INVENTION

Field of the Invention

The present invention relates to a transparent conductive film in which a transparent conductive layer is provided on a film substrate and a method for manufacturing the same. The transparent conductive film of the present invention is suitably used in touch panel applications.

Description of the Related Art

A transparent conductive film in which a transparent conductive thin film is formed on a transparent polymer substrate has been broadly used in transparent electrodes for solar cells, inorganic EL elements, and organic EL elements, electromagnetic wave shielding materials, touch panels, and the like. Especially, the installation rate of the touch panel in cellular phones, portable game machines, and the like has been increasing, and demand for a transparent conductive film has been rapidly increasing.

As a transparent conductive film used in a touch panel and the like, there has been broadly used a transparent conductive film in which a conductive metal oxide film of an indium tin complex oxide (ITO) or the like is formed on a flexible transparent polymer substrate such as a polyethylene terephthalate film. In such a transparent conductive film, from the viewpoint of preventing deterioration of visibility due to precipitation of a low molecular weight component such as an oligomer from the transparent polymer substrate, it has been proposed to form a cured resin layer (a hard coat layer) serving also as a diffusion preventing layer of the low molecular weight component on a substrate (Japanese Patent Application Laid-Open No. 2002-103504, for example).

Because the surface smoothness of the cured resin layer is generally high, the transparent conductive film in which the cured resin layer is provided on the surface of the substrate has such problems that it has inferior handling properties due to insufficient slipping property and anti-blocking properties. When a film is produced or processed, a long sheet is often wound in a roll to give a wound body in view of productivity and handling properties. However, the surface of the film having insufficient slipping property is easily scratched when the film is transported in a roll or when the film is wound up into a wound body, and its winding properties tend to deteriorate when the film is wound into a roll. When a film having inferior anti-blocking properties is wound into a roll, blocking easily occurs during the storage and the transportation of the wound body. From the viewpoint of solving these problems, a protective film (also referred to as a separator) is bonded onto the surface of the transparent conductive film, whereby the winding properties have been improved while protecting the surface of the transparent conductive film.

However, because the roll diameter and weight increase when the film is wound into a roll due to bonding of the protective film onto the surface of the film, it becomes difficult to improve workability due to the long film. In addition, an increase in cost and waste due to the use of the protective film may cause some problem. From the viewpoint of solving these problems, it has been proposed to improve the slipping property and the anti-blocking properties by forming irregularities on the surface of the cured resin layer by a method for incorporating fine particles into the cured resin layer (Japanese Patent Application Laid-Open No. 10-323931) or a method for using a coating composition containing two or more components that separate in phase from each other as a cured resin composition (Japanese Patent Application Laid-Open No. 2009-123685). From the viewpoint of balancing good slipping property, good anti-blocking properties, and good transparency at the same time, a method has been proposed in Japanese Patent Application Laid-Open No. 2010-157439 in which a coating composition containing two or more components that separate in phase from each other and a metal oxide or metal fluoride super fine particles having an average particle size of less than 200 nm are used together.

As described in Japanese Patent Application Laid-Open No. 10-323931, it is necessary to increase the particle size and the content of the particles in order to give sufficient easy slipping property by forming irregularities through addition of particles to the cured resin layer. Because of that, the transparency of the cured resin layer and the transparent conductive film tends to deteriorate due to light scattering of the fine particles, or the external appearance tends to be poor so that stripes caused by particles are generated during the formation of the cured resin layer.

On the other hand, it has been disclosed in Japanese Patent Application Laid-Open Nos. 2009-123685 and 2010-157439 to form a cured resin layer having a thickness of 3.5 μm from the coating composition containing two or more components that separate in phase from each other. With this configuration, a decrease of the transparency and generation of stripes are suppressed. However, it was found from the investigation by the present inventors that, as the thickness of the cured resin layer, in which the coating resin composition having two or more components that separate in phase from each other, increases, the handling properties of the film tend to deteriorate independent of the slipping property and the anti-blocking properties because the transparent conductive film curls due to heat generated when the transparent conductive layer is crystallized or when a touch panel is formed. On the other hand, when the thickness of the cured resin layer is decreased, the generation of curl is suppressed. However, it was found that it tends to be difficult to obtain stable anti-blocking properties and easy slipping property because the formation of irregularities of the surface is insufficient and because the formation of irregularities of the surface becomes uneven.

SUMMARY OF THE INVENTION

In view of the above-described viewpoints, an object of the present invention is to provide a transparent conductive film having good transparency and a good external appearance while having anti-blocking properties.

The present inventors made earnest studies to solve the above-described problems. As a result, they found that the above-described object can be achieved by using a transparent conductive film including a cured resin layer containing fine particles of a prescribed average particle size, and completed the present invention. That is, the present invention relates to a transparent conductive film having a transparent polymer substrate and a transparent conductive layer on one main surfaces of the transparent polymer substrate and in which a cured resin layer with surface irregularities is formed at least one of: between the transparent polymer substrate and the transparent conductive layer; and on the main surface opposite to the surface with the transparent conductive layer formed thereon of the transparent polymer substrate.

The thickness of the cured resin layer in the transparent conductive film of the present invention is preferably 1 μm or more and 3 μm or less. The cured resin layer contains: a resin composition containing at least two components; and fine particles, and phase separation occurs in the resin composition. The content of the fine particles is preferably 0.01 to 5 parts by weight to 100 parts by weight of solid content of the resin composition. The average particle size of the fine particles is preferably 25 to 80% of the thickness of the cured resin layer. The average particle size of the fine particles is preferably 250 to 2400 nm.

The present invention also relates to a transparent conductive film wound body in which a long sheet of the transparent conductive film is wound.

Because the thickness of the cured resin layer of the transparent conductive film of the present invention is small (1 μm or more and 3 μm or less), the film is hardly curled even by heating when the transparent conductive layer is crystallized or when the touch panel is formed, and the film has excellent handing properties. Because the cured resin layer contains a resin composition containing at least two components that undergoes phase separation based on a difference in physical properties and fine particles having a prescribed average particle size, the transparent conductive film has excellent transparency and an excellent external appearance, and also has anti-blocking properties.

Because such a transparent conductive film has excellent film winding properties while the generation of scratches on the surface of the film during handling is suppressed, a wound body can be easily obtained in which a long sheet is wound into a roll without bonding a protective film onto the surface. Because of that, a wound body of a longer sheet can be easily produced, and the film has excellent workability when it is used to form a touch panel afterwards and can contribute to a decrease in the cost and waste.

DESCRIPTION OF THE PREFERRED EMBODIMENTS

Figure 1:
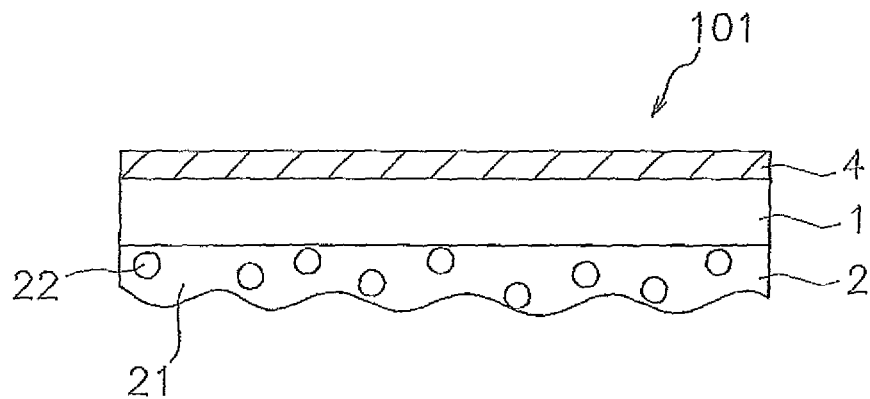
FIG. 1 is a schematic sectional view of the transparent conductive film according to one embodiment of the present invention.
Figure 2:
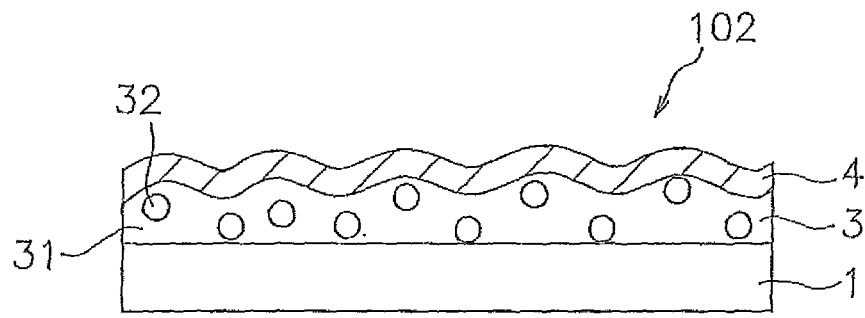
FIG. 2 is a schematic sectional view of the transparent conductive film according to one embodiment of the present invention.
Figure 3:
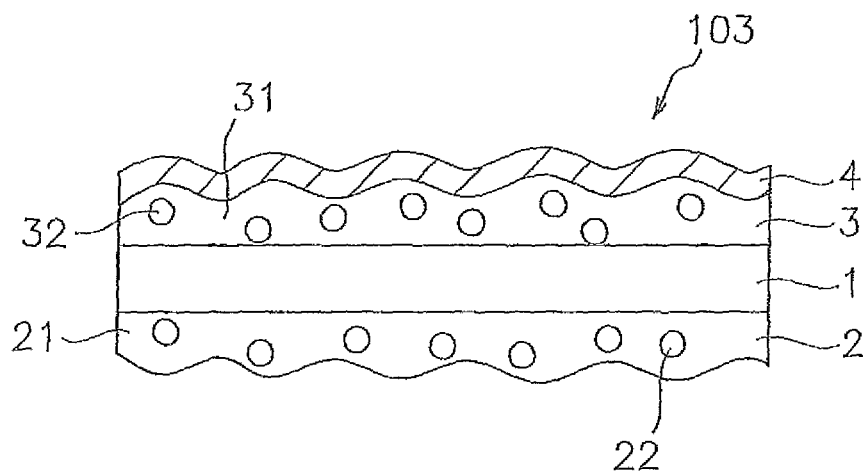
FIG. 3 is a schematic sectional view of the transparent conductive film according to one embodiment of the present invention.

Embodiments of the present invention are explained below by referring to the drawings. FIGS. 1 to 3 are schematic sectional views each showing one embodiment of the transparent conductive film according to the present invention. In a transparent conductive film 101 in FIG. 1, a transparent conductive layer 4 is formed on a first main surface that is one of the main surfaces of a transparent polymer substrate 1, and a cured resin layer 2 containing a resin composition 21 and fine particles 22 is formed on a second main surface that is the other main surface. In a transparent conductive film 102 in FIG. 2, the transparent conductive layer 4 is formed on a first main surface that is one of the main surfaces of the transparent polymer substrate 1, and a cured resin layer 3 containing a resin composition 31 and fine particles 32 is formed between the transparent polymer substrate 1 and the transparent conductive layer 4. In the transparent conductive film 103 in FIG. 3, the cured resin layers 2 and 3 are formed on a first main surface that is one of the main surfaces of the transparent polymer substrate 1 and on a second main surface that is the other main surface, respectively.

<Transparent Polymer Substrate>

There is no particular limitation to the transparent polymer substrate 1, and various types of plastic films having transparency may be used. Examples of the material for the transparent polymer substrate 1 include polyester resins, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. Among these, polyester resins, polycarbonate resins, and polyolefin resins are particularly preferred.

The thickness of the transparent polymer substrate 1 is preferably in a range of 2 to 200 μm and more preferably in a range of 2 to 100 μm. When the thickness of the transparent polymer substrate 1 is less than 2 μm, the mechanical strength of the transparent polymer substrate 1 becomes insufficient and the operation of forming the transparent conductive layer 4 successively by making the film substrate into a roll may become difficult. On the other hand, when the thickness exceeds 200 μm, the scratch resistance of the transparent conductive layer 4 and tap property for a touch panel may not be improved.

The surface of the transparent polymer substrate 1 may be previously subjected to sputtering, corona discharge treatment, flame treatment, ultraviolet irradiation, electron beam irradiation, chemical treatment, etching treatment such as oxidation, or undercoating treatment such that the adhesion of the transparent polymer substrate 1 to the cured resin layer, the transparent conductive layer or the like formed on the film substrate can be improved. If necessary, the surface of the film substrate may also be subjected to dust removing or cleaning by solvent cleaning, ultrasonic cleaning or the like, before the cured resin layer or the transparent conductive layer are formed.

As shown in FIGS. 1 to 3, the cured resin layers 2 and 3 having surface irregularities are formed on at least one of the main surfaces of the transparent polymer substrate 1. The thickness of the cured resin layer is preferably 1 μm or more and 3 μm or less. The thickness of the cured resin layers 2 and 3 is more preferably 1 to 2.5 μm, and further preferably 1 to 2 μm. When the thickness of the cured resin layer is excessively small, precipitation of the low molecular weight components such as an oligomer from the transparent polymer substrate can not be suppressed, and the visibility of the transparent conductive film and the touch panel using the transparent conductive film tends to deteriorate. On the other hand, when the thickness of the cured resin layer is excessively large, the transparent conductive film tends to curl with the surface on which the cured resin layer is formed being inside due to heating during crystallization of the transparent conductive layer or during assembly of a touch panel. Because of that, when the thickness of the cured resin layer is large, the handling properties of the film tend to deteriorate, independent of the anti-blocking properties and the easy slipping property.

In the present specification, the thickness of the cured resin layer refers to the average thickness of the cured resin layer. As can be understood from the following examples, the arithmetic average roughness (Ra) of the surface of the cured resin layer in the present invention is in a range of about 5% with respect to the thickness of the cured resin layer. Because of that, the local thickness variation due to the influence of the surface irregularities is small relative to the thickness of the cured resin layer, and when the thickness of the cured resin layer is measured, the influence of the surface irregularities can be substantially ignored.

<Cured Resin Layer>

The cured resin layers 2 and 3 contain the resin compositions 21 and 31 containing at least two components and the fine particles 22 and 32 that are dispersed in the resin compositions. The resin compositions containing at least two components undergo phase separation. Resin compositions undergoing phase separation based on a difference in physical properties can be preferably used. As described in Japanese Patent Application Laid-Open Nos. 2009-123685 and 2010-157439, it has been conventionally known that irregularities are formed on the surface of the cured resin layer of the transparent conductive film by the cured resin layer using a coating resin composition containing at least two components that undergoes phase separation based on a difference in physical properties. With such a cured resin layer, because it is not necessary to add fine particles in the cured resin layer to form irregularities, a transparent conductive film having excellent transparency can be obtained. However, when the thickness of the cured resin layer based on the coating resin composition that undergoes phase separation is small (3 μm or less), the formation of irregularities on the surface of the cured resin layer is insufficient and a variation occurs in the formation of the surface irregularities while curling of the substrate can be suppressed, and it is difficult to obtain stable anti-blocking properties and easy slipping property.

In contrast, in the present invention, the formation of irregularities on the surface is promoted and stable anti-blocking properties and easy slipping property can be obtained by incorporating fine particles into the cured resin layer. The average particle size of fine particles in the cured resin layer is preferably 25 to 80%, more preferably 30 to 70%, and further preferably 35 to 65% of the thickness of the cured resin layer. When the average particle size of fine particles exceeds 80% of the thickness of the cured resin layer, failures in outer appearance tends to be generated such that the transparency is impaired as haze increases and that stripes are generated due to particles during the formation of the cured resin layer. On the other hand, when the average particle size of fine particles is smaller than 25% of the thickness of the cured resin layer, the formation of irregularities on the surface is insufficient, and the blocking tends to easily occur.

From the viewpoint of suppressing the increase of haze, the average particle size of fine particles is preferably 2400 nm or less, more preferably 2000 nm or less, and further preferably 1000 nm or less. From the viewpoint of giving the anti-blocking properties to the transparent conductive film, the average particle size of fine particles is preferably 250 nm or more, more preferably 500 nm or more, and further preferably 700 nm or more. In the present specification, the "average particle size" is an average particle size ($D_{50}$) in the particle size distribution on the volume basis, and can be obtained by measuring a solution in which fine particles are dispersed in water by an optical diffraction or a scattering method.

The content of the fine particles in the cured resin layer is preferably 0.01 to 5 parts by weight, more preferably 0.05 to 2 parts by weight, and further preferably 0.1 to 1 part by weight to 100 parts by weight of the solid content of the resin composition. When the content of the fine particles in the cured resin layer is small, it tends to be difficult to form sufficient irregularities for giving the anti-blocking properties and the easy slipping property to the surface of the cured resin layer. On the other hand, when the content of the fine particles is too large, haze of the transparent conductive film becomes high due to light scattering by the fine particles and visibility tends to deteriorate. When the content of the fine particles is too large, stripes are generated during the formation of the cured resin layer (during application of the solution), and the visibility tends to impaired and there is a case that the electrical properties of the conductive layer may become uneven.

As described above, the particle size of the fine particles in the cured resin layer is smaller than the thickness of the cured resin layer, and the content of the fine particles is small. Because of that, it is generally difficult to consider that surface irregularities are formed that are sufficient to give the anti-blocking properties and the easy slipping property only by the existence of such particles. In the present invention, the reason is unclear as to why the surface irregularities are formed when a small amount of the fine particles are added. However, the fine particles trigger off the phase separation of the resin composition, and it is assumed that formation of large irregularities becomes easy by promoting the phase separation.

The arithmetic average roughness (Ra) of the surface opposite to the transparent polymer substrate 1 of the cured resin layers 2 and 3 is preferably 5 to 200 nm, more preferably 10 to 150 nm, further preferably 15 to 70 nm, and especially preferably 20 to 50 nm. When the irregularities of the surface of the cured resin layer are excessively large, failures in outer appearance tend to be generated such that the transparency is impaired as haze increases and that stripes are generated due to particles during the formation of the cured resin layer. When the irregularities of the surface of the cured resin layer are excessively small, the blocking tends to easily occur. In the present invention, the value of the surface irregularities (the arithmetic average roughness) of the cured resin layer can be preferably set to the above-described range by adjusting the average particle size and the content of the fine particles in the cured resin layer, the ratio of the average particle size of the fine particles to the thickness of the cured resin layer, etc.

The phase separation refers to a state in which two or more components are insoluble each other and contact with each other at the interface. Examples of a phase separation structure include a sea island structure in which one component exists in another component in a form of islands and a structure in which two components exist alternatively or randomly in a form of stripes. However, it is not limited to these. The phase separation structure can be confirmed by observing the cured resin layer with a surface profile measurement system (Wyco Series manufactured by Veeco Instruments Inc.).

(Resin Composition)

A composition containing at least two components that undergoes phase separation based on a difference in physical properties can be suitably used as the resin composition used to form the cured resin layer in the present invention. An example of such a resin composition is a composition described in International Publication WO 2005/073763. The resin composition is a composition that, when the resin composition is applied to the substrate, a resin layer having random irregularities on the surface can be formed with first and second components in the resin composition undergoing phase separation based on a difference of their physical properties. Specifically, the first and second components contained in this resin composition can be independently selected from the group consisting of monomers, oligomers, and polymers.

Examples of the first and second components include monomers such as polyfunctional monomers and resins having a (meth)acrylic resin, an olefin resin, a polyether resin, a polyester resin, a polyurethane resin, a polysiloxane resin, a polysilane resin, a polyimide resin, or a fluororesin in the skeletal structure. These resins may be a so-called oligomer that has a low molecular weight. An example of the polyfunctional monomer may be a dealcoholization reactant of a polyhydric alcohol and (meth)acrylate. Specifically, dipentaerythritolhexa(meth)acrylate, trimethylolpropanetri (meth)acrylate, and the like can be used. Examples of the resin containing a (meth)acrylic resin as the skeletal structure include a resin obtained by polymerizing or copolymerizing (meth)acrylic monomers and a resin obtained by copolymerizing (meth)acrylic monomers and other monomers having an ethylenically unsaturated double bond. Examples of the resin containing an olefin resin in the skeletal structure include polyethylene, polypropylene, an ethylene propylene copolymer, an ethylene vinyl acetate copolymer, an ionomer, an ethylene vinyl alcohol copolymer, and an ethylene vinyl chloride copolymer. The resin containing a polyether resin in the skeletal structure is a resin having an ether bond in the molecular chain, and examples thereof include polyethylene glycol, polypropylene glycol, and polytetramethylene glycol. The resin containing a polyester resin in the skeletal structure is a resin having an ester bond in the molecular chain, and examples thereof include an unsaturated polyester resin, an alkyd resin, and polyethylene terephthalate. The resin containing a polyurethane resin in the skeletal structure is a resin having a urethane bond in the molecular chain. The resin containing a polysiloxane resin in the skeletal structure is a resin having a siloxane bond in the molecular chain. The resin containing a polysilane resin in the skeletal structure is a resin having a silane bond in the molecular chain. The resin containing a polyimide resin in the skeletal structure is a resin having an imide bond in the molecular chain. The resin containing a fluororesin in the skeletal structure is a resin including a structure in which part or all hydrogen of polyethylene is substituted by fluorine.

The oligomers and polymers may be a copolymer consisting of two or more of the above-described skeletal structures or may be a copolymer consisting of the above-described skeletal structures and monomers other than the structures.

The first and second components of the resin composition may be an oligomer or a polymer containing same kind of skeletal structures or may be an oligomer or a polymer containing different skeletal structures. Either one of the first and second components may be a monomer and the other one may be an oligomer or a polymer.

The respective first and second components of the resin compositions preferably have functional groups that react with each other. The hardness of the cured resin layer can be increased by making such functional groups react with each other. Examples of the combination of such functional groups include a combination of a functional group having active hydrogen (a hydroxyl group, an amino group, a thiol group, or a carboxyl group) with an epoxy group, a combination of a functional group having active hydrogen with an isocyanate group, a combination of an ethylenically unsaturated group with an ethylenically unsaturated group, a combination of a silanol group with a silanol group, a combination of a silanol group with an epoxy group, a combination of a functional group having active hydrogen with a functional group having active hydrogen, a combination of active methylene with an acryloyl group, and a combination of an oxazoline group with a carboxyl group.

Herein, the "functional groups that react with each other" includes functional groups that react with each other by mixing a catalyst or a curing agent together although the reaction does not proceed when only the first and second components are mixed together. Examples of the usable catalyst include a photoinitiator, a radical initiator, an acid-base catalyst, and a metal catalyst. Examples of the usable curing agent include a melamine curing agent, a (block) isocyanate curing agent, and an epoxy curing agent.

When the respective first and second components of the resin compositions have functional groups that react with each other, the mixture of the first and second components has curing properties such as heat curing properties and photocuring properties including an ultraviolet curing property, a visible light curing property, and an infrared curing property.

In the present invention, the first and second components are preferably a resin containing a (meth)acrylic resin in the skeletal structure. The molecular weight (weight average molecular weight when the first and second components are resins) of the first and second components is preferably 100 to 100,000.

Examples of the physical property difference in the first and second components that can cause phase separation of the first and second components when the difference reaches a certain level include the SP value, the glass transition temperature (Tg), the surface tension, and the number average molecular weight.

The SP value is an abbreviation of a solubility parameter, and it is a scale of the solubility. The polarity is higher as the SP value is larger, and the polarity is lower as the SP value is smaller. The SP value can be measured by a method described in Suh, Clarke, J. P. S. A-1, 5, 1671-1681 (1967).

When a difference in physical properties of each of the first and second components that causes phase separation of the first and second components is a difference in the SP value, the difference in the SP value between the first component and the second component is preferably 0.5 or more and more preferably 0.8 or more. The upper limit of the difference in the SP value is not especially limited. However, it is generally 15 or less. When the difference in the SP value between the first component and the second component is 0.5 or more, the mutual solubility of each resin is low, and thereby, the phase separation of the first and second components is considered to occur after applying the coating composition.

As described later, the resin composition is applied onto a substrate as a coating composition containing an organic solvent and fine particles to form the cured resin layer. For the first and second components and the organic solvent contained in the coating composition, the SP value ($SP_1$) of the first component, the SP value ($SP_2$) of the second component, and the SP value ($SP_{sol}$) of the organic solvent preferably satisfy the following condition;

$SP_1 < SP_2$, and the difference between $SP_1$ and $SP_{sol}$ is 2 or less.

When the difference between $SP_1$ and $SP_{sol}$ is 2 or less, a cured resin layer can be prepared that has low haze and excellent irregularities forming properties by the phase separation. The difference between $SP_1$ and $SP_{sol}$ is more preferably 1 or less, that is, in a range of 0 to 1. It is acceptable that the difference between $SP_1$ and $SP_{sol}$ is 2 or less. $SP_1$ and $SP_{sol}$ may satisfy $SP_1 < SP_{sol}$ or $SP_1 > SP_{sol}$.

One example of the first and second components that satisfy the above formulae is a case where the first component is an oligomer or a polymer and the second component is a monomer. The oligomer or the polymer of the first component is more preferably an unsaturated double bond-containing acrylic copolymer. The monomer of the second component is more preferably a polyfunctional unsaturated double bond-containing monomer. The "oligomer" in the present specification means a polymer having a repeating unit, the number of the repeating units being 3 to 10.

Examples of the unsaturated double bond-containing acrylic copolymer include a resin obtained by polymerizing or copolymerizing (meth)acrylic monomers, a resin obtained by copolymerizing (meth)acrylic monomers and other monomers having an ethylenically unsaturated double bond, a resin obtained by reacting (meth)acrylic monomers, other monomers having an ethylenically unsaturated double bond, and monomers having an epoxy group with each other, and a resin obtained by reacting (meth)acrylic monomers, other monomers having an ethylenically unsaturated double bond, and monomers having an isocyanate group with each other. One of these unsaturated double bond-containing acrylic copolymers can be used alone or two or more of them can be mixed and used.

The above-described polyfunctional monomers such as a dealcoholization reactant of a polyhydric alcohol and (meth) acrylate can be used as the polyfunctional unsaturated double bond-containing monomer. Specific examples thereof include dipentaerythritolhexa(meth)acrylate, dipentaerythritolpenta(meth)acrylate, trimethylolpropanetri(meth)acrylate, ditrimethylolpropanetetra(meth)acrylate, and neopentylglycol di(meth)acrylate. An acrylate monomer having a polyethylene glycol skeleton such as polyethylene glycol #200 diacrylate (manufactured by Kyoeisha Chemical Co., Ltd.) can also be used. One of these polyfunctional unsaturated double bond-containing monomers can be used alone or two or more of them can be mixed and used.

Another example of the first and second components that satisfy the above formulae is a case where both the first and second components are oligomers or resins. A resin containing a (meth)acrylic resin in the skeletal structure is preferably used as the first and second components. The first component is preferably an unsaturated double bond-containing acrylic copolymer and the second component is preferably a polyfunctional unsaturated double bond-containing monomer.

When both of the first and second components are polymers, the glass transition temperature ($T_g$) can be obtained by the same method as a normal method for measuring $T_g$ by dynamic viscoelasticity. When both of the first and second components are polymers and the difference in physical properties of each of the first and second components that causes phase separation of the first and second components is a difference in $T_g$, it is preferable that either one of the first and second components has a $T_g$ lower than an ambient temperature during the application of the composition, and the other component has a $T_g$ higher than the ambient temperature during the application of the composition. In this case, because the resin having a $T_g$ higher than the ambient temperature is in a glassy state in which molecular motion is controlled at this ambient temperature, it is considered that the resin aggregates in the coating composition after the application, causing phase separation of the first and second components.

When the first and second components are polymers, the ambient temperature during the application of the composition is 20 to 150° C., the $T_g$ of the resin having a $T_g$ lower than the ambient temperature during the application of the composition is −70 to 120° C., and the $T_g$ of the resin having a $T_g$ higher than the ambient temperature during the application of the composition is 90 to 200° C., for example. The ambient temperature is preferably 40 to 120° C., the $T_g$ of the resin having a $T_g$ lower than the ambient temperature is preferably −60 to 80° C., and the $T_g$ of the resin having a $T_g$ higher than the ambient temperature is preferably 100 to 150° C. In this case, the resin having a $T_g$ lower than the ambient temperature during the application of the composition may be the first component and the resin having a $T_g$ higher than the ambient temperature during the application of the composition may be the second component or vice versa.

When either one of the first and second components is a monomer, a difference in $T_g$ between the first and second components is preferably 20° C. or more, and the $T_g$ of the component having a higher $T_g$ of the $T_g$s of the first and second components is preferably 20° C. or more. The difference in $T_g$ between the first and second components is more preferably 30° C. or more, and further preferably 50° C. or more. The upper limit of the difference in $T_g$ between the first and second components is not especially limited. However, it is 100° C. or less, for example. Because the molecular motion of the component having a higher $T_g$ is controlled in this case, it is considered that this component aggregates in the coating composition after the application, causing phase separation of the first and second components.

When either one of the first and second components is a monomer, the $T_g$ of the component having a lower $T_g$, that is, the $T_g$ of the monomer, is −70 to 0° C., and the $T_g$ of the resin having a higher $T_g$ is 20 to 200° C., for example. In this case, the ambient temperature during the application of the composition is 20 to 120° C., for example. The $T_g$ of the monomer component having a lower $T_g$ is more preferably −60 to 0° C., and the $T_g$ of the resin having a higher $T_g$ is more preferably 30 to 150° C. In this case, the ambient temperature during the application of the composition is 20 to 120° C., for example. In these cases, the monomer may be the first component or the second component.

When the first or second component is a monomer, it is difficult to measure the glass transition temperature using the above-described method. In general, the glass transition temperature of the monomer is considered to be almost equal to the melting point of the monomer. In the present specification, when the first or second component is a monomer, the $T_g$ of the monomer shall be equal to the melting point of the monomer.

When the difference in physical properties of each of the first and second components that causes phase separation of the first and second components is the difference in the surface tension, the difference in the surface tension between the first component and the second component is preferably 1 to 70 dyn/cm. The difference is more preferably 5 to 30 dyn/cm. When the difference in the surface tension between the first component and the second component is 1 to 70 dyn/cm, the resin having a higher surface tension tends to aggregate, and with this, the phase separation of the first and second components is considered to occur after applying the coating composition. The surface tension can be measured by obtaining a static surface tension measured by a ring method using Dynometer manufactured by BYK-Chemie GmbH.

The ratio between the first and second components in the resin composition is appropriately set so that phase separation occurs in both components. However, it is preferably, in weight ratio, 1:99 to 99:1, and more preferably 1:99 to 50:50, and further preferably 1:99 to 20:80. The resin composition may contain resins that are normally used besides the first and second components.

(Fine Particles)

In the present invention, fine particles having transparency such as fine particles of various metal oxides, glass, plastics, and the like can be used as the fine particles contained in the cured resin layer without any special limitation. Examples thereof include inorganic fine particles of silica, alumina, titania, zirconia, calcium oxide, etc., crosslinked or non-crosslinked organic fine particles made of various polymers such as polymethylmethacrylate, polystyrene, polyurethane, an acrylic resin, an acrylic styrene copolymer, benzoguanamine, melamine, and polycarbonate, and silicone fine particles. One kind or two or more kinds of the fine particles can be appropriately selected and used. However, organic fine particles are preferable. From the viewpoint of a refractive index, an acrylic resin is preferable as the organic fine particles.

(Coating Composition)

The coating composition used to form the cured resin layer contains the above-described resin compositions, fine particles, and a solvent. Various additives can be added into the coating composition as necessary. Examples of such additives include conventional additives such as an antistatic agent, a plasticizer, a surfactant, an antioxidant, and an ultraviolet absorbent.

The coating composition is prepared by mixing the first and second components and other resins, and the above-described fine particles with a solvent, additives, catalysts, and the like as necessary. The solvent in the coating composition is not especially limited, and appropriately selected considering the first and second components, the material of the portion that serves as a base of coating, an application method of the composition, and the like. Specific examples of the solvent include an aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole, and phenetole; ester solvents such as ethyl acetate, butyl acetate, isopropyl acetate, and ethylene glycol diacetate; amide solvents such as dimethylformamide, diethylformamide, and N-methylpyrrolidone; cellosolve solvents such as methylcellosolve, ethylcellosolve, and butylcellosolve; alcohol solvents such as methanol, ethanol, and propanol; and halogen solvents such as dichloromethane and chloroform. These solvents may be used alone or two or more may be used together. Among these solvents, an ester solvent, an ether solvent, an alcohol solvent, and a ketone solvent can be preferably used.

When the difference in physical properties that causes phase separation of the first and second components is the difference in the SP value, examples of the solvent include ketone solvents such as methyl ethyl ketone, acetone, methyl isobutyl ketone, and cyclohexanone; alcohol solvents such as methanol, ethanol, propanol, isopropanol, and butanol; and ether solvents such as anisole, phenetolepropylene glycol monomethy ether, ethylene glycol dimethyl ether, ethylene glycol diethyl ether, diethylene glycol dimethyl ether, and diethylene glycol diethyl ether from the viewpoint of setting the difference between $SP_1$ and $SP_{sol}$ to 2 or less as described above. One of these solvents may be used alone or two or more of the organic solvents may be mixed and used. When two or more of the organic solvents are used, at least one of the organic solvents used may bring a difference between $SP_1$ and $SP_{sol}$ of 2 or less.

The fine particles in the coating composition are preferably dispersed in the solution. Various known methods can be adopted as a method for dispersing the fine particles in the solution such as a method for mixing by adding the fine particles to the resin composition solution and a method for adding the fine particles dispersed in the solvent in advance to the resin composition solution.

The solid content concentration in the coating composition is preferably 25 to 55% by weight, more preferably 30 to 50% by weight, and most preferably 35 to 45% by weight. When the solid content concentration is too low, the variation of the irregularities of the surface of the cured resin layer becomes large in a drying step after coating, and the haze of the portion may increase where the irregularities on the surface of the cured resin layer becomes large. On the other hand, when the solid content concentration is too high, the components that cause the phase separation easily aggregate. As a result, the aggregated portion becomes conspicuous and the outer appearance of the transparent conductive film may be impaired.

(Coating and Curing)

The cured resin layer is formed by applying the above-described coating composition onto the base material. The application of the coating composition onto a base material is performed only on one surface of the base material in the embodiment as in FIGS. 1 and 2, and performed on both surfaces of the base material in the embodiment as in FIG. 3. The coating composition may be applied directly onto the transparent polymer substrate 1, or may be applied onto an undercoat layer, a dielectric layer (not shown), or the like that is formed on the transparent polymer substrate 1.

The method for applying the coating composition can be appropriately selected according to the coating composition and the state of the coating step. Examples of the method include a dip coating method, an air knife coating method, a curtain coating method, a roller coating method, a wire bar coating method, a gravure coating method, and an extrusion coating method.

The coating film applied to the base material may be cured as it is or may be dried before curing to undergo the phase separation in advance. When the coating film is dried before curing, it is dried at 30 to 200° C., more preferably 40 to 150° C. for 0.1 to 60 minutes, more preferably 1 to 30 minutes to remove the solvent and have the components in the coating film undergo the phase separation. When the mixture of the first and second components is photocurable, phase separation by drying before curing has an advantage that the solvent in the cured resin layer can be effectively removed and the irregularities can be easily formed on the surface.

As another method for causing the phase separation before curing, it is possible to use a method for causing the phase separation by irradiating light to the coating film. As light to be irradiated, for example, light having an exposure amount of 0.1 to 1.5 J/cm$^2$, and preferably 0.5 to 1.5 J/cm$^2$, can be used. Although a wavelength of irradiation light is not particularly limited, irradiation light having a wavelength of 360 nm or less can be adopted, for example. There is an advantage that phase separation is performed by irradiating light, making it possible to avoid a variation in a surface profile due to a drying variation of solvents contained in the coating composition.

After applying the coating composition, the cured resin layer is formed by curing the dried coating film as necessary. If a mixture of the first and second components is heat curable, the mixture can be cured by heating at 40 to 280° C., and preferably at 80 to 250° C., for 0.1 to 180 minutes, and preferably for 1 to 60 minutes. If a mixture of the first and second components is photo-curable, the mixture can be cured by irradiating light using a light source emitting light having a necessary wavelength. Light irradiation can be used for phase separation as described above.

<Transparent Conductive Layer>

The constituting materials of the transparent conductive layer 4 are not especially limited, and metal oxides of at least one metal selected from the group consisting of indium, tin, zinc, gallium, antimony, titanium, silicon, zirconium, magnesium, aluminum, gold, silver, copper, palladium, and tungsten can be preferably used. The metal oxide may further contain metal atoms described above as necessary. For example, indium oxide (ITO) containing tin oxide, and tin oxide (ATO) containing antimony can be preferably used.

The thickness of the transparent conductive layer 4 is not especially limited. However, the thickness is preferably 10 nm or more to obtain a continuous film having good conductivity with a surface resistance of $1 \times 10^3$ Ω/square or less. When the film thickness is too large, it causes a decrease in transparency. Therefore, the film thickness is preferably 15 to 35 nm, and more preferably 20 to 30 nm. When the thickness of the transparent conductive layer is less than 15 nm, the electric resistance of the film surface becomes high and it becomes difficult to form a continuous film. When the thickness of the transparent conductive layer exceeds 35 nm, it may cause a decrease in transparency.

The method for forming the transparent conductive layer 4 is not especially limited, and a conventionally known method can be adopted. Specific examples thereof include a dry process such as a vacuum vapor deposition method, a sputtering method, and an ion plating method. An appropriate method can be adopted according to the required film thickness. As shown in FIGS. 2 and 3, in a case where the transparent conductive layer 4 is formed on the surface with the cured resin layer 3 formed thereon, the surface of the transparent conductive layer 4 substantially maintains the irregularities of the surface of the cured resin layer 3 that is the under layer of the surface of the transparent conductive layer 4 when the transparent conductive layer 4 is formed by a dry process such as a sputtering method. Because of that, even when the transparent conductive layer 4 is formed on the cured resin layer 3, the anti-blocking properties and the easy slipping property can be given also to the surface of the transparent conductive layer 4.

The transparent conductive layer 4 can be crystallized by a thermal annealing treatment as necessary. By crystallizing the transparent conductive layer, the transparency and the durability can be improved in addition to a decrease in resistance of the transparent conductive layer being lowered. Because the thickness of the cured resin layer of the transparent conductive film of the present invention is 1 μm or more and 3 μm or less, the generation of curl can be suppressed also in the thermal annealing treatment, and an excellent handing property can be achieved.

The transparent conductive layer 4 may be patterned by etching, or the like. For example, the transparent conductive layer is preferably patterned into stripes in the transparent conductive film that is used in a capacitance-type touch panel or a matrix-type resistance film-type touch panel. When the transparent conductive layer 4 is to be patterned by etching, etching may become difficult if crystallization of the transparent conductive layer 4 is performed in advance. Because of that, the annealing treatment of the transparent conductive layer 3 is preferably performed after patterning the transparent conductive layer 4.

<Dielectric Layer>

A dielectric layer (not shown) may be provided between the transparent polymer substrate 1 and the transparent conductive layer 4 or between the cured resin layer 3 and the transparent conductive layer 4 in order to control the adhesion and the reflectance properties of the transparent conductive layer. One or two or more dielectric layers may be provided. The dielectric layer is formed from an inorganic material, an organic material, or a mixture of an inorganic material and an organic material. For example, $SiO_2$, $MgF_2$, and $Al_2O_3$ are preferably used as the inorganic materials to form the dielectric layer. Examples of the organic material include an acrylic resin, a urethane resin, a melamine resin, an alkyd resin, and a siloxane polymer. Especially, a thermosetting resin made of a mixture of a melamine resin, an alkyd resin, and an organic silane condensate is preferably used as the organic material. The dielectric layer can be formed by a vacuum vapor deposition method, a sputtering method, an ion plating method, a coating method, or the like using the above-described materials.

As shown in FIGS. 2 and 3, when the dielectric layer is formed between the cured resin layer 3 and the transparent conductive layer 4 in the embodiment in which the transparent conductive layer 4 is formed on the surface with the cured resin layer 3 formed thereon, the dielectric layer is preferably formed by a dry process such as a vacuum vapor deposition method, a sputtering method, and an ion plating method. When the dielectric layer is formed by a dry process, the surface of the dielectric layer where the transparent conductive layer 4 is formed substantially maintains the irregular shape of the surface of the cured resin layer that is the under layer. Because the irregular shape is maintained also on the surface of the transparent conductive layer 4, a transparent conductive film having the anti-blocking properties and the easy slipping property can be produced.

<Wound Body of Transparent Conductive Film>

The transparent conductive film of the present invention can be made into a wound body in which a long sheet is wound into a roll. The wound body of a long sheet of the transparent conductive film can be formed by forming the above-described cured resin layer, transparent conductive layer, and additional layers such as dielectric layer by a roll-to-roll method using a rolled body of a long sheet as a transparent polymer substrate. In the formation of such wound body, a protective film (a separator) having a weak pressure-sensitive adhesive layer may be bonded onto the surface of the transparent conductive film and then the laminate may be wound into a roll. However, because the transparent conductive film of the present invention has improved slipping property and anti-blocking properties, a wound body of a long sheet of the transparent conductive film can be formed without using a protective film. Because excellent winding properties of the film can be obtained while generation of scratches onto the film surface during handling is suppressed due to the improved slipping property and anti-blocking properties, a wound body in which a long sheet is wound into a roll can be easily obtained without bonding a protective film onto the surface. Because a wound body of a long sheet of the transparent conductive film of the present invention can be formed without using a protective film, workability when the film is used to form a touch panel or the like thereafter is excellent. Eliminating the need for the protective film that is a member in the process can contribute to cost reduction and waste reduction.

The transparent conductive film of the present invention can be suitably applied to touch panels of an optical type, an ultrasonic type, a capacitive type, and a resistive film type for example.

Upon formation of the touch panel, another base material such as glass or a polymer film can be bonded to one or both main surfaces of the transparent conductive film with a transparent pressure-sensitive adhesive layer interposed therebetween. For example, it is possible to form a laminated body in which a transparent substrate is bonded on the surface of the transparent conductive film on which the transparent conductive layer 4 is not formed, with a transparent pressure-sensitive adhesive layer interposed therebetween. The transparent substrate may consist of one base film or may be a laminated body of two or more base films (in which the films are laminated with a transparent pressure-sensitive adhesive layer interposed therebetween, for example). A hard coat layer can be provided on the outer surface of the transparent substrate that is bonded to the transparent conductive film.

Any transparent pressure-sensitive adhesive may be used as the pressure-sensitive adhesive layer 4 for bonding the transparent conductive film and the base material without limitation. For example, the pressure-sensitive adhesive may be appropriately selected from pressure-sensitive adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and exhibit suitable wettability and adhesion properties such as cohesiveness and adhesiveness, and are good in weather or heat resistance.

When the transparent conductive film according to the present invention is used to form a touch panel, an excellent handing property can be obtained during the formation of the touch panel. Because of that, it is possible to manufacture a touch panel having excellent transparency and visibility with high productivity.

EXAMPLES

In the following, the present invention is explained in detail with reference to examples. However, the present invention is not limited to the examples as long as there is no deviation from the gist of the present invention.

Example 1

Preparation of the Coating Composition

Prepared was a resin solution (product name: Lucifral NAB-007 manufactured by Nippon Paint Co., Ltd.) which contained 60% by weight in a solid content concentration of a resin component including a resin composition that forms the surface irregularities by phase separation and a photopolymerization initiator in a mixed solvent of methyl ethyl ketone and methyl isobutyl ketone.

Acrylic fine particles (product name: BMSA-18GN manufactured by Sekisui Plastic Co., Ltd., average particle size 0.8 μm) were dispersed in methyl isobutyl ketone. The dispersion was mixed with the resin solution to prepare a coating composition having a solid content concentration of 40% by weight containing 0.1 part by weight of acrylic fine particles to 100 parts of the resin component.

(Formation of the Cured Resin Layer)

The coating composition was applied onto one of main surfaces of a transparent polymer substrate made of a biaxially stretched polyethylene terephthalate film (in the following, referred to as a PET film) having a thickness of 50 μm using a bar coater, and the coating film was dried by heating at 60° C. for 1 minute. After that, the resin composition was cured by irradiation with an ultraviolet ray of accumulative intensity of 300 mJ/cm$^2$ with a high pressure mercury lamp to form a cured resin layer having a thickness of 1.2 μm. The thickness of the cured resin layer was obtained from an average value of the thicknesses measured at 5 points that were equally spaced in the width direction of the film using a spectrometer (product name: MCPD2000 manufactured by Otsuka Electronics Co., Ltd.).

(Formation of the Transparent Conductive Layer)

An ITO film having a thickness of 25 nm was formed on the surface of the PET film where the cured resin layer was not formed by a sputtering method using a sintered body made of 90% by weight of indium oxide and 10% by weight of tin monoxide in an atmosphere of 0.53 Pa consisting of 80% of argon gas and 20% of oxygen gas.

The transparent conductive film obtained in such a way has a laminated structure shown in FIG. 1.

Example 2

A transparent conductive film having a laminated structure shown in FIG. 1 was formed in the same way as in Example 1 except that the thickness of the cured resin layer was changed to 2.7 μm.

Example 3

A transparent conductive film having a laminated structure shown in FIG. 1 was formed in the same way as in Example 1 except that the thickness of the cured resin layer was changed to 1.1 μm.

Example 4

A transparent conductive film having a laminated structure shown in FIG. 1 was formed in the same way as in Example 1 except that, in preparation of the coating composition, the content of the acrylic fine particles (product name: BMSA-18GN manufactured by Sekisui Plastic Co., Ltd., average particle size 0.8 μm) was changed to 2.0 parts by weight to 100 parts by weight of the resin component.

Example 5

A transparent conductive film having a laminated structure shown in FIG. 1 was formed in the same way as in Example 1 except that, in preparation of the coating composition, the content of the acrylic fine particles (product mane: BMSA-18GN manufactured by Sekisui Plastic Co., Ltd., average particle size 0.8 μm) was changed to 5.0 parts by weight to 100 parts by weight of the resin component.

Example 6

A transparent conductive film having a laminated structure shown in FIG. 1 was formed in the same way as in Example 1 except that, in preparation of the coating composition, product name: MX-150 manufactured by Soken Chemical & Engineering Co., Ltd. (average particle size 1.5 μm) was used instead of product name: BMSA-18GN manufactured by Sekisui Plastic Co., Ltd. as the acrylic fine particles, that the content of the acrylic fine particles was changed to 0.1 parts by weight to 100 parts by weight of the resin component, and that a cured resin layer having a thickness of 2.7 μm was formed on a PET film using this coating composition.

Example 7

Preparation of the Coating Composition

Prepared was a resin solution (product name: Lucifral NAB-007 manufactured by Nippon Paint Co., Ltd.) which contained 60% by weight in a solid content concentration of a resin component including a resin composition that forms the surface irregularities by phase separation and a photopolymerization initiator in a mixed solvent of methyl ethyl ketone and methyl isobutyl ketone.

Acrylic fine particles (product name: BMSA-18GN manufactured by Sekisui Plastic Co., Ltd., average particle size 0.8 μm) were dispersed in methyl isobutyl ketone. The dispersion was mixed with the resin solution to prepare a coating composition having a solid content concentration of 40% by weight containing 0.1 part by weight of acrylic fine particles to 100 parts of the resin component.

(Formation of the Cured Resin Layer)

The coating composition was applied onto one of main surfaces of a transparent polymer substrate made of a biaxially stretched polyethylene terephthalate film (in the following, referred to as a PET film) having a thickness of 50 μm using a bar coater, and the coating film was dried by heating at 60° C. for 1 minute. After that, the resin composition was cured by irradiation with an ultraviolet ray of accumulative intensity of 300 mJ/cm$^2$ with a high pressure mercury lamp to form a cured resin layer having a thickness of 1.2 μm. The thickness of the cured resin layer was obtained from an average value of the thicknesses measured at 5 points that were equally spaced in the width direction of the film using a spectrometer (product name: MCPD2000 manufactured by Otsuka Electronics Co., Ltd.).

(Formation of the Transparent Conductive Layer)

An ITO film having a thickness of 25 nm was formed on the formed cured resin layer by a sputtering method using a sintered body made of 90% by weight of indium oxide and 10% by weight of tin monoxide in an atmosphere of 0.53 Pa consisting of 80% of argon gas and 20% of oxygen gas.

The transparent conductive film obtained in such a way has a laminated structure shown in FIG. 2.

Example 8

A transparent conductive film having a laminated structure shown in FIG. 2 was formed in the same way as in Example 7 except that the thickness of the cured resin layer was changed to 2.7 μm.

Example 9

A transparent conductive film having a laminated structure shown in FIG. 2 was formed in the same way as in Example 7 except that, in preparation of the coating composition, product name: MX-150 manufactured by Soken Chemical & Engineering Co., Ltd. (average particle size 1.5 μm) was used instead of product name: BMSA-18GN manufactured by Sekisui Plastic Co., Ltd. as the acrylic fine particles, that the content of the acrylic fine particles was changed to 0.1 parts by weight to 100 parts by weight of the resin component, and that a cured resin layer having a thickness of 2.7 μm was formed on a PET film using this coating composition.

Comparative Example 1

A transparent conductive film having a laminated structure shown in FIG. 1 was formed in the same way as in Example 1 except that, in preparation of the coating composition, no fine particles were incorporated into the coating composition.

Comparative Example 2

A transparent conductive film having a laminated structure shown in FIG. 1 was formed in the same way as in Example 1 except that the thickness of the cured resin layer was changed to 3.5 μm.

Comparative Example 3

A transparent conductive film having a laminated structure shown in FIG. 1 was formed in the same way as in Example 1 except that the thickness of the cured resin layer was changed to 0.9 μm.

Comparative Example 4

A transparent conductive film having a laminated structure shown in FIG. 1 was formed in the same way as in Example 1 except that, in preparation of the coating composition, the content of the acrylic fine particles (product name: BMSA-18GN manufactured by Sekisui Plastic Co., Ltd., average particle size 0.8 μm) was changed to 10.0 parts by weight to 100 parts by weight of the resin component.

Comparative Example 5

A transparent conductive film having a laminated structure shown in FIG. 1 was formed in the same way as in Example 1 except that, in preparation of the coating composition, product name: MX-150 manufactured by Soken Chemical & Engineering Co., Ltd. (average particle size 1.5 μm) was used instead of product name: BMSA-18GN manufactured by Sekisui Plastic Co., Ltd. as the acrylic fine particles, and that the content of the acrylic fine particles was changed to 5 parts by weight to 100 parts by weight of the resin component.

Comparative Example 6

A transparent conductive film having a laminated structure shown in FIG. 1 was formed in the same way as in Example 1 except that, in preparation of the coating composition, product name: MX-150 manufactured by Soken Chemical & Engineering Co., Ltd. (average particle size 1.5 μm) was used instead of product name: BMSA-18GN manufactured by Sekisui Plastic Co., Ltd. as the acrylic fine particles, and that the content of the acrylic fine particles was changed to 0.1 parts by weight to 100 parts by weight of the resin component.

[Evaluation]

The following evaluation was performed on the transparent conductive films obtained in examples and comparative examples.

(Haze)

The haze was measured in accordance with the haze (turbidity) of JIS K7136 (1981) using a haze meter (model HR300 manufactured by Murakami Color Research Laboratory Co., Ltd.).

(Arithmetic Average Roughness)

The measurement was performed on the surface opposite to the surface of the PET film side of the cured resin layer for the transparent conductive films of Examples 1 to 6 and Comparative Examples 1 to 6 and on the surface opposite to the surface of the PET film side of the cured resin layer before the formation of the transparent conductive layer for the transparent conductive films of Examples 7 to 9 respectively using an atomic force microscope (AFM) (product name: Nanoscope IV manufactured by Digital Instruments, Inc.).

(Presence of the Stripes)

A black tape was bonded onto each of the surface opposite to the surface of the PET film side of the transparent conductive layer for the transparent conductive films of Examples 1 to 6 and Comparative Examples 1 to 6 and the surface opposite to the surface of the cured resin layer side of the PET film for the transparent conductive films of Examples 7 to 9, and light reflected from the transparent conductive film was visually observed under a fluorescent light in a dark room to determine the presence or absence of the stripes. The determination of the stripes was performed in the evaluation area range of 2,500 mm² (50×50 mm) per sample (number of samples N=10).

(Anti-Blocking Properties)

A polycarbonate film (product name: Elmech manufactured by Kaneka Corporation) having a smooth surface that was formed by a solution casting method was contacted and pressed to each of the surface with the cured resin layer formed thereon (exposed surface) for the transparent conductive films of Examples 1 to 6 and Comparative Examples 1 to 6 and to each of the surface with the transparent conductive layer formed thereon (exposed surface) for the transparent conductive films of Examples 7 to 9 and presence or absence of blocking (adhesion of films) was visually observed (number of samples=10).

The evaluation results of each of the transparent conductive films of examples and comparative examples are shown in Table 1. As the result of observing the surface of the cured resin layer by a surface profiler system (Wyco NT3300 manufactured by Veeco Instruments, Inc.), phase separation structure of the resin composition that formed the cured resin layer was confirmed in all of the examples and comparative examples.

When Examples 1, 4, and 5, and Comparative Example 4 are compared with each other, it is found that the haze of the transparent conductive film tends to increase as the content of fine particles increases and the haze exceeds 1.0% when the content exceeds 5%. On the other hand, according to Comparative Example 1, the generation of blocking was observed when fine particles were not contained. However, it is found that the blocking is suppressed by adding a small amount of fine particles to the resin component as in Example 1.

When Examples 1 to 3 and Comparative Example 3 are compared with each other, the generation of stripes was observed and the haze increased to 1.3% in Comparative Example 3 in which the size of the fine particles was 89% of the thickness of the cured resin layer even though the same coating compositions were used. From the comparison between Example 6 and Comparative Example 6 that use the same coating composition, it is found that stripes tend to be generated when the ratio of the particle size of the fine particles to the thickness of the cured resin layer is large. When Example 4 and Comparative Example 2 that use fine particles having an average particle size of 0.8 µm are compared with each other, the blocking is generated in Comparative Example 2 because the size of the fine particles is relatively small, being 23% of the thickness of the cured resin layer, even though the content of the fine particles is larger in Comparative Example 2.

It is found that it is possible to obtain a transparent conductive film in which generation of stripes is suppressed while the anti-blocking properties are given by setting the size of the fine particles to a prescribed ratio relative to the thickness of the cured resin layer and that also has excellent transparency by setting the content of fine particles in the cured resin layer to a prescribed range.

EXPLANATION OF THE REFERENCE NUMERALS

1 TRANSPARENT POLYMER SUBSTRATE
2, 3 CURED RESIN LAYER

TABLE 1

| | CURED RESIN LAYER THICKNESS (µm) | FINE PARTICLES | | PARTICLE SIZE OF FINE PARTICLES/ THICKNESS OF CURED RESIN LAYER % | TRANSPARENT CONDUCTIVE FILM | | | |
|---|---|---|---|---|---|---|---|---|
| | | PARTICLE SIZE (µm) | CONTENT (PARTS BY WEIGHT) | | HAZE (%) | Ra (nm) | NUMBER OF GENERATION OF BLOCKING | NUMBER OF GENERATION OF STRIPES |
| EXAMPLE 1 | 1.2 | 0.8 | 0.1 | 67 | 0.6 | 25 | 0 | 0 |
| EXAMPLE 2 | 2.7 | 0.8 | 0.1 | 30 | 0.6 | 25 | 0 | 0 |
| EXAMPLE 3 | 1.1 | 0.8 | 0.1 | 73 | 0.8 | 30 | 0 | 0 |
| EXAMPLE 4 | 1.2 | 0.8 | 2 | 67 | 0.8 | 35 | 0 | 0 |
| EXAMPLE 5 | 1.2 | 0.8 | 5 | 67 | 1.0 | 40 | 0 | 0 |
| EXAMPLE 6 | 2.7 | 1.5 | 0.1 | 56 | 0.8 | 30 | 0 | 0 |
| EXAMPLE 7 | 1.2 | 0.8 | 0.1 | 67 | 0.6 | 25 | 0 | 0 |
| EXAMPLE 8 | 2.7 | 0.8 | 0.1 | 30 | 0.6 | 25 | 0 | 0 |
| EXAMPLE 9 | 2.7 | 1.5 | 0.1 | 56 | 0.8 | 30 | 0 | 0 |
| COMPARATIVE EXAMPLE 1 | 1.2 | — | — | — | 0.5 | 5 | 4 | 0 |
| COMPARATIVE EXAMPLE 2 | 3.5 | 0.8 | 3 | 23 | 0.5 | 5 | 2 | 0 |
| COMPARATIVE EXAMPLE 3 | 0.9 | 0.8 | 0.1 | 89 | 1.3 | 80 | 0 | 6 |
| COMPARATIVE EXAMPLE 4 | 1.2 | 0.8 | 10 | 67 | 1.5 | 120 | 0 | 0 |
| COMPARATIVE EXAMPLE 5 | 1.2 | 1.5 | 5 | 125 | 1.5 | 100 | 0 | 7 |
| COMPARATIVE EXAMPLE 6 | 1.2 | 1.5 | 0.1 | 125 | 1.0 | 80 | 0 | 3 |

4 TRANSPARENT CONDUCTIVE LAYER
21, 31 RESIN COMPOSITION
22, 32 FINE PARTICLES
101 to 103 TRANSPARENT CONDUCTIVE FILM

What is claimed is:

1. A transparent conductive film having a transparent polymer substrate and a transparent conductive layer on one main surface of the transparent polymer substrate, wherein
a cured resin layer with surface irregularities is formed at least one of: between the transparent polymer substrate and the transparent conductive layer; and on the main surface opposite to the surface with the transparent conductive layer formed thereon of the transparent polymer substrate,
the thickness of the cured resin layer is 1 µm or more and 3 µm or less,
the cured resin layer contains: a resin composition containing at least two components; and 0.01 to 5 parts by weight of fine particles to 100 parts by weight of the solid content of the resin composition,
the resin composition undergoes phase separation,
the average particle size of the fine particles is 25 to 80% of the thickness of the cured resin layer, and
the average particle size of the fine particles is 250 to 2400 nm.

2. The transparent conductive film according to claim 1, wherein the arithmetic average roughness of the surface opposite to the transparent polymer substrate side of the cured resin layer is 5 to 200 nm.

3. A transparent conductive film wound body, wherein a long sheet of the transparent conductive film according to claim 1 is wound into a roll.

4. A touch panel including the transparent conductive film according to claim 1.

5. A transparent conductive film wound body, wherein a long sheet of the transparent conductive film according to claim 2 is wound into a roll.

6. A touch panel including the transparent conductive film according to claim 2.

* * * * *